H. F. RHOADS.
INSECT ATTRACTING AND EXTERMINATING DEVICE.
APPLICATION FILED SEPT. 27, 1920.
1,375,016.
Patented Apr. 19, 1921.
3 SHEETS—SHEET 1.
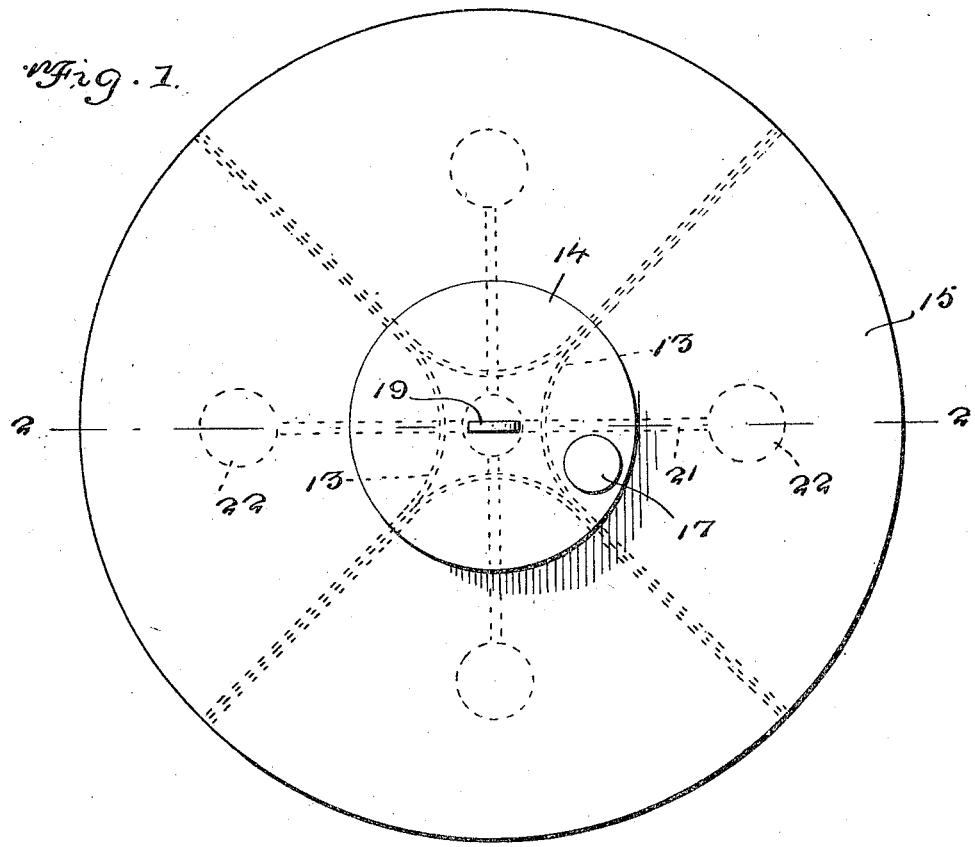
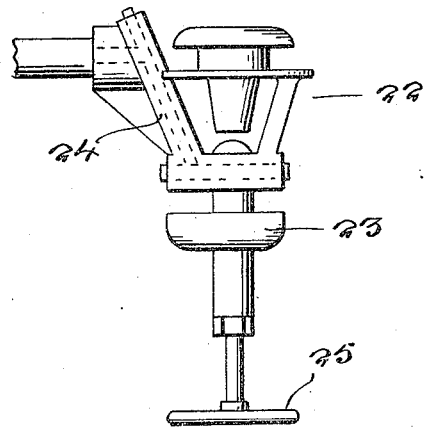

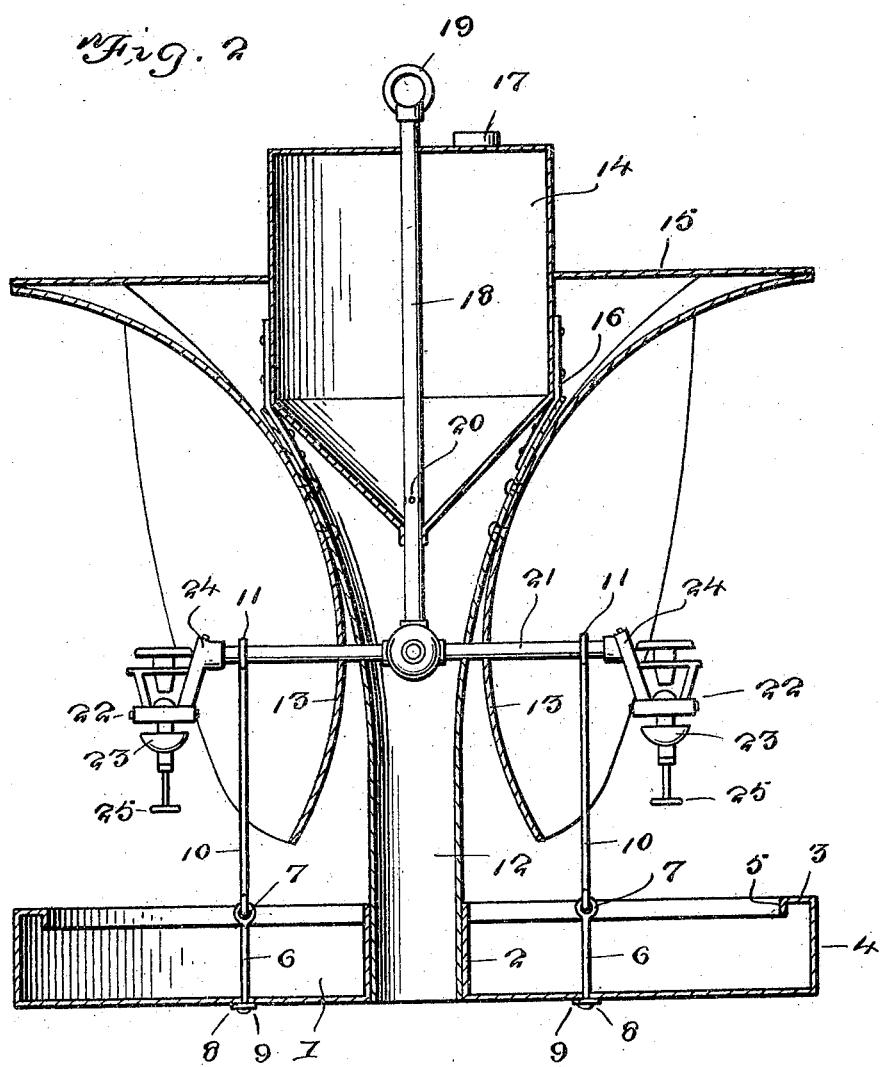

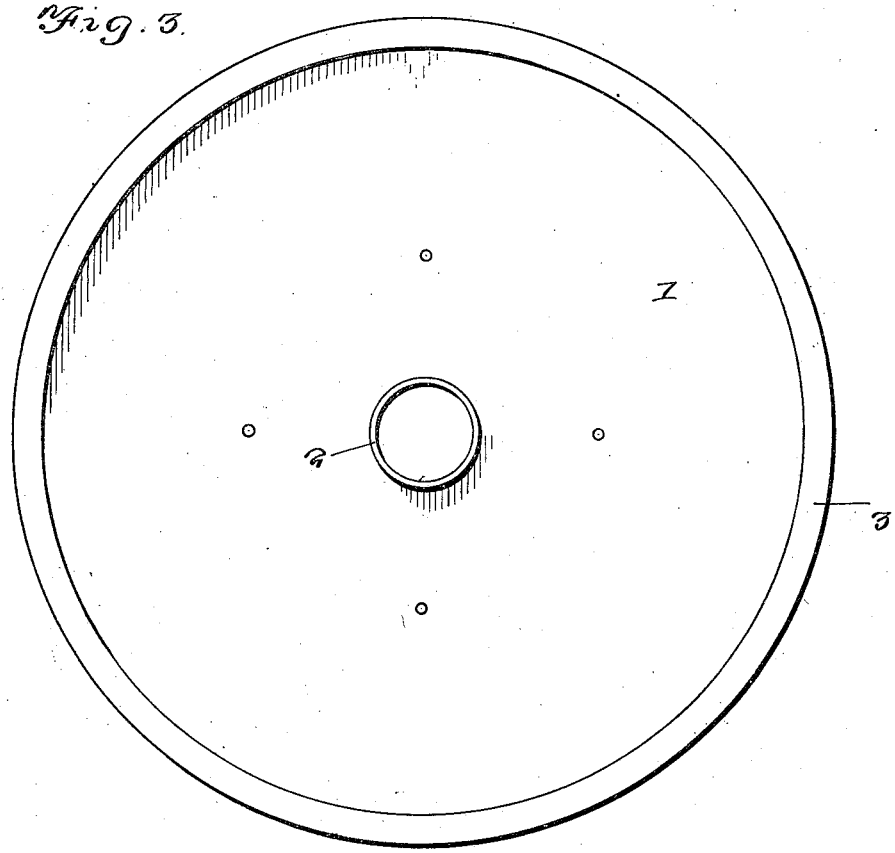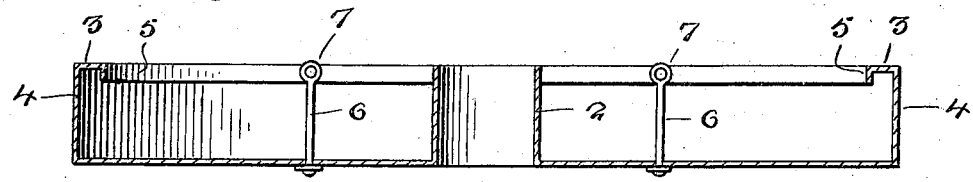

UNITED STATES PATENT OFFICE.

HOWARD F. RHOADS, OF WINSTON-SALEM, NORTH CAROLINA, ASSIGNOR OF ONE-THIRD TO JOHN A. POWELL, OF MIDDLETOWN, OHIO.

INSECT ATTRACTING AND EXTERMINATING DEVICE.

1,375,016.

Specification of Letters Patent. Patented Apr. 19, 1921.

Application filed September 27, 1920. Serial No. 412,994.

*To all whom it may concern:*

Be it known that I, HOWARD F. RHOADS, a citizen of the United States, residing at Winston-Salem, in the county of Forsyth and State of North Carolina, have invented new and useful Improvements in Insect Attracting and Exterminating Devices, of which the following is a specification.

My present invention has for its object the provision of a simple, durable and efficient device, of lantern type, to attract and destroy flying insects of all kinds.

To the attainment of the foregoing the invention consists in the improvement as hereinafter described and definitely claimed.

In the accompanying drawings, hereby made a part hereof:—

Figure 1 is a plan view of my novel lantern-like device.

Fig. 2 is a vertical diametrical section of the same.

Fig. 3 is a plan view of the trap-pan comprised in the device.

Fig. 4 is a diametrical section of the same.

Fig. 5 is an enlarged side elevation of one of the burners of the device.

Similar numerals designate corresponding parts in all of the views of the drawings.

Among other elements my novel device comprises a trap-pan 1. The said pan is provided with a central sleeve 2 and with an inwardly-reaching guard flange 3 on its side wall 4; the said flange 3 terminating at its inner edge with a skirt 5. The pan 1 is adapted to contain about one inch of some agent, preferably liquid such as coal oil, calculated to kill insects. Grouped about and spaced from the sleeve 2 of the pan 1 are rods 6 with eyes 7 at their upper ends and heads 8 at their lower ends, between which heads 8 and the underside of the pan are interposed washers 9; the passage of the rods through the pan bottom being rendered liquid-tight in any appropriate manner. Interlocked at their lower ends with the eyes 7 on rods 6 are hanger rods 10 with hooks 11 at their upper ends.

Arranged snugly in the sleeve 2 of the pan 1 is the lower end portion of a tubular standard 12 which like the pan is of sheet metal. The upper portion of the said standard is flared and is concave exteriorly as illustrated.

Assembled about the upper portion of the standard 12 and fixedly connected or joined to each other and the said standard 12 are reflectors 13 which together constitute a wind-break—*i. e.*, are adapted to prevent the passage of the wind through the device.

At 14 is a tank for gasolene or other hydrocarbon, and at 15 is a cap plate that surrounds and is fixed to the tank 14 and is also fixed to the reflectors 13. The lower portion of the tank 14 is tapered and disposed in the upper portion of the hollow standard 12, and bracket plates 16 are interposed between and fixed to the tank and the standard, Fig. 2. At its upper end the tank 14 is provided with a filling opening, normally closed by a cap 17.

Extending centrally through the tank 14 is a hanger rod 18, with an eye 19 at its upper end. The said rod 18 is wholly or partially tubular and in its lower and tubular portion are apertures 20 for the passage of gasolene from the interior of the tank 14 to the interior of the rod or pipe. Below the tank 14 the rod or pipe 18 is joined to pipe arms 21 that reach outwardly through the wall of the standard 12 and the reflectors 13 and serve for the suspension of the pan 1 through the medium of the hanger elements described, and also serve to carry burners 22, one in front of each reflector as best shown in Fig. 5. Each of the burners 22 is provided with a starting cup 23 below a retort 24 and is also provided with a valve having at the lower end of its stem a handle 25. I would here have it understood, however, that it is within the purview of my invention to employ burners of any type compatible with the purpose of my novel device.

In the practical use of my device it will be readily understood that when the pan 1 is charged with gasolene or other appropriate liquid and the burners 22 are operated insects will be attracted in great numbers to the device, and after striking against the reflectors 13 will be precipitated into the pan 1.

Having described my invention, what I claim and desire to secure by Letters-Patent, is:—

1. An insect attracting and exterminating device, comprising a tubular standard the upper portion of which is flared or enlarged, a hydrocarbon tank having a lower tapered portion disposed in the upper enlarged portion of said standard, brackets arranged between and connecting the standard and the tank, reflectors grouped about the standard and connected together and to the standard, a hanger extending above and below the tank and having a conduit portion in communication with the lower portion of the tank and also having arms reaching outwardly through the standard and the reflectors, burners carried by the said arms and arranged each in front of a reflector, and a catch-pan suspended from the said arms.

2. An insect attracting and exterminating device, comprising a tubular standard the upper portion of which is flared or enlarged, a hydrocarbon tank having a lower tapered portion disposed in the upper enlarged portion of said standard, brackets arranged between and connecting the standard and the tank, reflectors grouped about the standard and connected together and to the standard, a hanger extending above and below the tank and having a conduit portion in communication with the lower portion of the tank and also having arms reaching outwardly through the standard and the reflectors, burners carried by the said arms and arranged each in front of a reflector, a catch-pan arranged below the reflectors and burners and having a central sleeve receiving the lower end portion of the standard and also having an inwardly and downwardly extending guard flange, bolts connected to the bottom of the catch-pan and extending upardly therefrom and terminating in eyes, and hanger rods interlocked with said eyes of the bolts and having hooks arranged over the arms of the conductors, whereby the catch-pan is suspended from said arms.

3. An insect attracting and destroying device, comprising a central standard, reflectors grouped about and connected with the same, a tank arranged between the upper portions of the reflectors and connected with the standard, burners disposed in front of the reflectors and connected with the interior of the tank, and a catch-pan disposed under the burners and reflectors and connected with the same and centered on the pending portion of the standard.

In testimony whereof I affix my signature.

HOWARD F. RHOADS.